(12) United States Patent
Ducotey, Jr. et al.

(10) Patent No.: US 7,204,019 B2
(45) Date of Patent: Apr. 17, 2007

(54) METHOD FOR REPAIRING AN APERTURED GAS TURBINE COMPONENT

(75) Inventors: Howard S. Ducotey, Jr., Tulsa, OK (US); Robert J. Zuber, Middletown, CT (US); Peter J. Draghi, Simsbury, CT (US)

(73) Assignee: United Technologies Corporation, Hartford, CT (US)

( * ) Notice: Subject to any disclaimer, the term of this patent is extended or adjusted under 35 U.S.C. 154(b) by 618 days.

(21) Appl. No.: 09/935,896

(22) Filed: Aug. 23, 2001

(65) Prior Publication Data

US 2003/0037436 A1    Feb. 27, 2003

(51) Int. Cl.
 B23P 6/00     (2006.01)
 B23P 19/04    (2006.01)

(52) U.S. Cl. ............... 29/889.1; 29/402.06; 29/402.08; 29/402.18; 29/889.721; 29/889.72

(58) Field of Classification Search ............... 29/887.1, 29/889, 889.721, 889.72, 402.06, 402.04, 29/402.08, 402.18; 219/69.15
See application file for complete search history.

(56) References Cited

U.S. PATENT DOCUMENTS

| | | | |
|---|---|---|---|
| 4,008,844 A | 2/1977 | Duvall et al. ............... 228/119 |
| 4,073,639 A | 2/1978 | Duvall et al. ............... 75/0.5 R |
| 4,197,443 A * | 4/1980 | Sidenstick ............... 219/69.15 |
| 4,209,348 A | 6/1980 | Duhl et al. ............... 148/3 |
| 4,321,310 A | 3/1982 | Ulion et al. ............... 428/612 |
| 4,321,311 A | 3/1982 | Strangman ............... 428/623 |
| 4,401,697 A | 8/1983 | Strangman ............... 427/250 |
| 4,405,659 A | 9/1983 | Strangman ............... 427/248.1 |
| 4,405,660 A | 9/1983 | Ulion et al. ............... 427/248.1 |
| 4,414,249 A | 11/1983 | Ulion et al. ............... 427/248.1 |
| RE32,121 E | 4/1986 | Gupta et al. ............... 428/656 |
| 4,585,481 A | 4/1986 | Gupta et al. ............... 106/14.05 |
| 4,643,782 A | 2/1987 | Harris et al. ............... 148/404 |
| 4,719,080 A | 1/1988 | Duhl et al. ............... 420/443 |
| 4,726,104 A * | 2/1988 | Foster et al. ............... 29/889.1 |
| 4,738,588 A * | 4/1988 | Field ............... 416/97 R |
| 5,062,205 A * | 11/1991 | Fraser ............... 228/119 |
| 5,068,084 A | 11/1991 | Cetel et al. ............... 420/443 |
| 5,081,765 A * | 1/1992 | Fraser et al. ............... 29/889.1 |
| 5,092,942 A * | 3/1992 | Fraser et al. ............... 148/529 |
| 5,156,321 A * | 10/1992 | Liburdi et al. ............... 228/119 |
| 5,262,245 A | 11/1993 | Ulion et al. ............... 428/469 |
| 5,437,737 A | 8/1995 | Draghi et al. ............... 148/23 |
| 5,549,767 A | 8/1996 | Pietruska et al. ............... 148/512 |
| 5,658,614 A * | 8/1997 | Basta et al. ............... 427/142 |
| 6,370,752 B1 * | 4/2002 | Anderson et al. ............... 29/402.09 |
| 6,375,425 B1 * | 4/2002 | Lee et al. ............... 29/889.721 |

* cited by examiner

*Primary Examiner*—Marc Jimenez
(74) *Attorney, Agent, or Firm*—Linda Cunha

(57) ABSTRACT

A method for repairing defects in a gas turbine component that comprises a substrate and an existing coating on the substrate. The article includes cooling holes having a predetermined air flow requirement and an outer shaped portion and an inner metering portion. The method comprises removing the existing coating and recoating the surface of the article with a nonoriginal coating. After the nonoriginal coating is applied onto the component, the cooling holes that meet a predetermined inspection criteria are reworked to remove the excess nonoriginal coating deposited in the outer shaped portion of the cooling holes. The reworking is done by receiving an electrode, having only a shaped portion with a preselected shape, in the outer shaped portion of the cooling holes thus restoring the cooling holes to the predetermined air flow requirement.

9 Claims, 2 Drawing Sheets

METHOD FOR REPAIRING AN APERTURED GAS TURBINE COMPONENT

TECHNICAL FIELD

The present invention is directed to repairs of a coated gas turbine component, and more particularly, to repairs of defects in an air-cooled gas turbine vane having diffusion cooling holes where the vane is coated with a thermal barrier coating (TBC) system.

BACKGROUND OF THE INVENTION

Over the years, gas turbine engine manufacturers have increased the temperature and pressure at which gas turbine engines operate to meet demands for more powerful and efficient engines. The increased temperature and pressure levels have imposed rigorous operating conditions on certain engine components, particularly turbine vanes and blades immediately downstream of a combustor. In modern engines, turbine vanes and blades may be exposed to temperatures above the melting point of the alloy from which they are made.

While manufacturers have been designing gas turbine engines that operate under very demanding conditions, they have been striving to improve gas turbine engine reliability and to extend maintenance intervals to improve the economics of operating gas turbine engines. Manufacturers have addressed both objectives by applying protective coatings to certain parts, particularly turbine vanes and blades. Initially, the coatings focused on providing oxidation and corrosion protection. Examples of these include overlay and diffusion aluminide coatings, MCrAlY coatings, where M is Ni, Co, Fe, or Ni/Co, and other metallic coatings. Commonly assigned U.S. Pat. Nos. 4,585,481 and Re 32,121, both to Gupta et al., describe such coatings. More recently, multi-layer, thermal barrier coatings (TBC) that comprise an oxidation and corrosion resistant metallic bond coat and a thermally insulating ceramic top coat have been used. Such coatings are described in commonly assigned U.S. Pat. No. 4,321,310 to Ulion et al., U.S. Pat No. 4,321,311 to Strangman, U.S. Pat No. 4,401,697 to Strangman, U.S. Pat No. 4,405,659 to Strangman, U.S. Pat No. 4,405,660 to Ulion et al., U.S. Pat No. 4,414,249 to Ulion et al., and U.S. Pat No. 5,262,245 to Ulion et al. Thermal barrier coatings provide thermal resistance to the high temperatures in a gas turbine engine in addition to providing oxidation and corrosion resistance.

For gas turbine applications, the materials and processing methods chosen for the thermal barrier coatings are selected to provide resistance to spallation (coating loss) of the ceramic outer layer during thermal cycling of the engine as well as resistance to the oxidizing and corrosive environment in the case of a TBC spallation event. During normal engine operation and after time, the thermal barrier coating, including the metallic bond coat and the ceramic top coat, will degrade in certain surface areas most subjected to strenuous operating conditions. The bond coat may interdiffuse with an article substrate in such surface areas during operation to the extent that its protective ability has been reduced below an acceptable level, requiring the removal and reapplication of a protective coating.

In addition, internal cooling techniques have been developed to keep the temperature of the vanes and blades within design limits while operating at high temperatures. For example, the outer surface of engine components exposed to the hot gas path are typically cooled with high pressure cooling air from the compressor section of the engine. Film cooling has proven to be an effective means of utilizing this cooling air. In this method, a layer of cool air is flowed between the high temperature gases and the external surfaces of the engine components. The layer of cooling air is formed by passing the cooling air through a series of small cooling holes in the component which are formed in a predetermined pattern. The resulting film of air reduces component surface temperature thereby deterring component distortion. Engine efficiency is also increased because higher turbine inlet temperature ranges are possible.

It is well known in the art that film cooling effectiveness can be increased by using diffusion holes that have a conical portion and an enlarged opening at the surface of the component. The shaping of the holes to diffuse air before it enters the boundary layer of the component broadens the spread of air downstream of the hole and thus, increases cooling effectiveness. In comparison, cylindrical shaped holes create a localized region downstream of the hole where cooling effectiveness decay is minimized. Although high quality diffusion holes provide superior performance, they are both costly and difficult to form.

Because turbine blades and vanes are expensive, a variety of refurbishment techniques have been developed to restore the deteriorated vanes to serviceable condition. The specific details of the various refurbishment techniques depend on the nature and extent of vane deterioration. For instance, existing protective coatings, such as, the thermal barrier coatings that include the bond coat and the ceramic top coat, may be removed from the blades and vanes.

Removal of the bond coat after removal of the ceramic top coat may be required due to surface degradation of the bond coat especially in those surface areas most subject to strenuous operating conditions. The ceramic portion of the coating may be stripped by soaking the part in a solution of KOH. The metallic portion of the coating may be stripped by soaking the part in a HCl solution.

Prior to reapplying a non-original replacement coating and after removal of the existing thermal barrier coating, a repair of cracks and other surface defects in the vane and blade castings may take place. Such a repair process is described in U.S. Pat. No. 4,008,844. According to this patent, a repair material comprises a mixture of metal powders made from two powders with different compositions. One composition approximates that of the superalloy to be repaired while the other composition also approximates the superalloy to be repaired, but contains a melting point depressant, usually boron. The mix has a paste-like consistency. The defect to be repaired is filled with a mixture of these powders and then heated to a temperature at which the boron containing the powder melts, but the boron-free powder and the substrate do not. Solidification then occurs isothermally over a period of time as the boron diffuses into the substrate thereby raising the solidification temperature of the melted constituent. Typically, all the cooling holes, for example in the vane, which depending of the airfoil can be in excess of about 300, are completely filled with the repair material. The filing process is both labor intensive and costly and will necessitate the remanufacture of the filled cooling holes, including the diffusion holes.

As is known in the case of blade repair, the blade may first be stripped of its original coating and then a nonoriginal replacement coating is applied to the blade casting prior to returning the blade to service. During this repair process, if the blade should have any cooling holes, these cooling holes may be subject to being partially or completely filled with the non-original coating material.

Such excess non-original coating can accumulate in the mouth of each cooling hole. This phenomenon is known as "coatdown" and can restrict the flow capacity of the affected holes. The effects of coatdown can diminish the cooling effectiveness of the film cooling thereby reducing the component's useful operating life. Any cooling holes that are subject to coatdown are typically unacceptable for return to service and will require reworking to remove the excess nonoriginal coating before the blade can be put back into service.

The effects of coatdown can be reversed by eroding the excess coating by propelling a high velocity, precisely focused stream of abrasive particles into the mouth of each affected hole. However, the erosive treatment can be inaccurate and nonrepeatable and is tedious and time consuming since a typical turbine airfoil has many rows of cooling holes.

Therefore, the repair of turbine components require the remanufacture of the cooling holes typically employing the processes used in the original manufacture of the component.

Many attempts have been made to remanufacture cost effective, high quality cooling holes in gas turbine engine components. For example, laser drilling has been used to produce cylindrical holes on the leading and trailing edges of vanes and blades. It is difficult, however, to produce shaped holes (diffusion holes) with this technique. This is a significant repair limitation because the geometry of the holes partially determines the effectiveness of cooling.

Electrical discharge machining (EDM) is a well-known process for producing shaped holes or other openings in metals. It uses current discharges to erode metal. For example, by pulsing a direct current between a positively charged work piece (anode) and an electrode (cathode), a spark discharge may be produced. The current occurs when the potential difference between the electrode and the work piece, which both contact a dielectric fluid, is great enough to breakdown the dielectric fluid and produce an electrically conductive channel. Upon application of a voltage or potential, a current flow results with enough heat energy to melt and erode the work piece. This process has application in the machining of small, deep, odd-shaped holes which are cumbersome to produce by other means.

An EDM method for producing or remanufacturing diffusion holes in engine components uses a copper electrode that is manufactured in a three-dimensional shape by stamping and coining. The electrode consists of at least one small diameter elongated end that produces the cooling air metering section. The elongated end is connected to a three-dimensional diffuser shaped portion that produces a diffuser area for the metering section. The electrode produces a similar shaped hole, with allowance for electrode overburn and EDM electrode erosion. Although the above EDM method is successful, limitations exist. EDM is a time intensive and relatively expensive process compared to other processes such as laser drilling. Also, the electrodes are fragile and are not reusable. The use of EDM to remanufacture the diffusion cooling holes in a typical vane is labor intensive and expensive.

Thus, what is needed in the gas turbine industry is a repair for gas turbine engine components, and in particular vanes, having diffusion cooling passages that permits removal of the entire coating system and the repair of defects while increasing the number of times a part can be repaired and reducing manufacturing cost and cycle time, as compared to prior art repair methods.

DISCLOSURE OF THE INVENTION

The present invention is directed towards a repair for gas turbine components coated with a thermal barrier coating that increases the number of times a component can be repaired and is less expensive and time consuming prior art repair method.

One aspect of the invention includes a method for repairing defects in a gas turbine engine component that comprises a substrate and an existing coating on a surface of the article. The article includes a plurality of cooling holes having a predetermined air flow requirement where the plurality of cooling holes extend from the substrate and the existing coating portion. The plurality of cooling holes include an outer shaped portion and an inner metering portion. The method described herein comprises removing the existing coating and recoating the surface of the article with a nonoriginal coating. After the nonoriginal coating is applied onto the component, the cooling holes that meet a predetermined inspection criteria are reworked, as necessary, to remove the excess nonoriginal coating deposited in a mouth region of the cooling holes. The reworking is done by receiving an electrode, having only a shaped portion with a preselected shape, in the outer shaped portion of the cooling holes thus restoring the outer shaped portion of the cooling holes to meet the predetermined air flow requirement.

Additionally, any excess nonoriginal coating located in the inner metering portion of the cooling holes is removed by propelling a stream of abrasive particles into the inner metering portions.

Another aspect of the invention includes the remanufacturing of the cooling holes that do not meet the predetermined inspection criteria. The remanufacturing includes filling the cooling holes with a repair material prior to the recoating step. The cooling holes are then remanufactured into the component by the use of electrical discharge machining.

These and other features and advantages of the present invention will become more apparent from the following description and accompanying drawings.

BRIEF DESCRIPTION OF THE DRAWINGS

The present invention will now be described, by way of example, with reference to the following FIGS., in which.

BEST MODE FOR CARRYING OUT THE INVENTION

The method of the present invention may be used to repair any gas turbine components or articles such as blades or vanes that are coated, in particular with a thermal barrier coating system. A thermal barrier coating system comprises a metallic bond coat and a top coat. Typically, engine run high pressure turbine airfoils, such as vanes, are candidates for the repair of the present invention.

Figure 1:
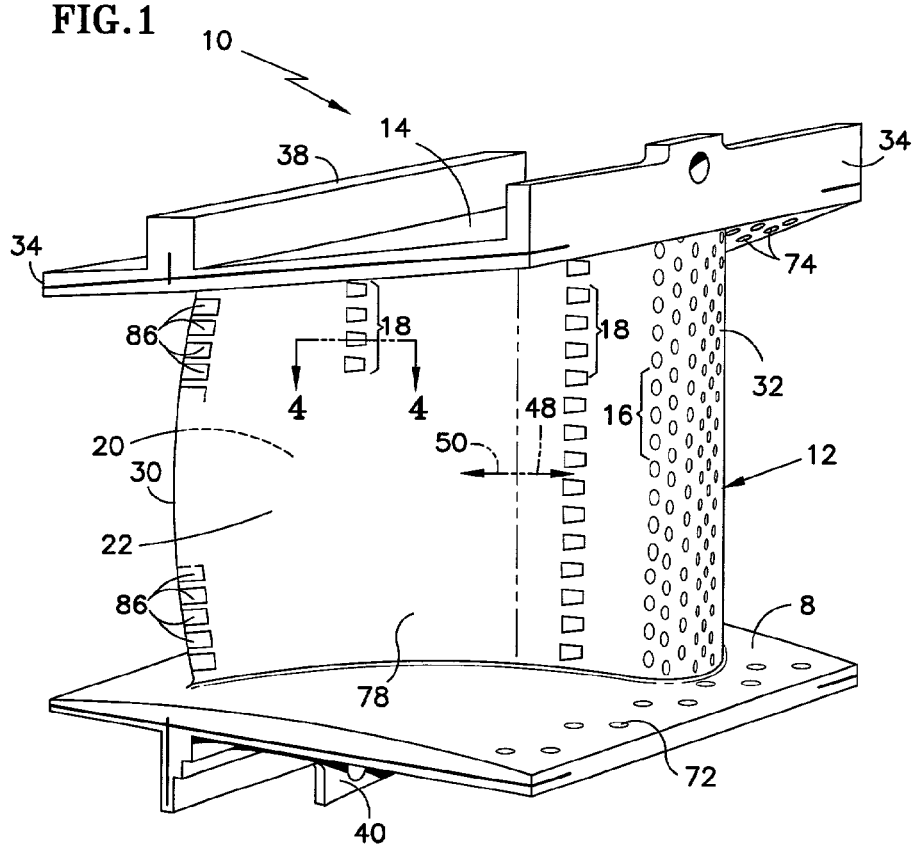
FIG. 1 is a perspective view of a typical gas turbine engine high pressure turbine vane.
Figure 2:
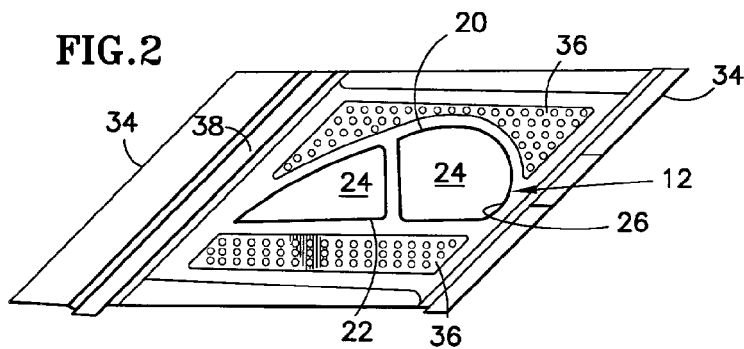
FIG. 2 is a top view of the vane of FIG. 1.
Figure 3:
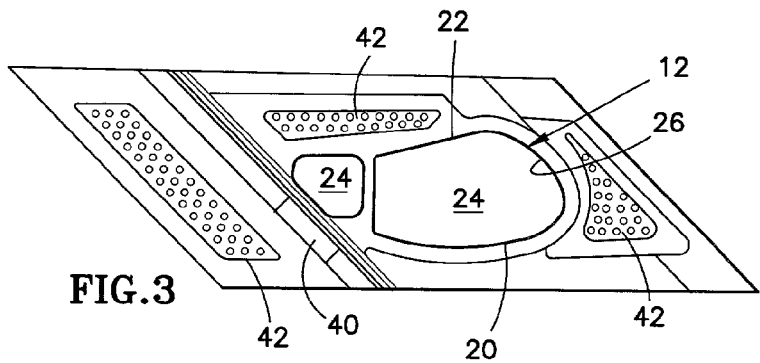
FIG. 3 is a bottom view of the vane of FIG. 1.

Referring to FIG. 1, a high pressure turbine vane (article) 10 is shown. Referring also to FIGS. 2 and 3, a top view and a bottom view are respectively shown for the vane 10 of FIG. 1. The vane 10 comprises an airfoil section (airfoil) 12 having at least one internal cavity 24 (FIG. 2), the internal cavity 24 having an internal surface 26 (FIG. 2). The airfoil section 12 has a convex surface 20 and a concave surface 22. The convex and concave surfaces 20, 22, respectively, are bounded by a trailing edge 30 and a leading edge 32 and together form an exterior surface 78 of the airfoil. The exterior surface 78 is exposed to the hot gas path. The trailing edge 30 of the airfoil 12 includes cooling slots 86. Also, the airfoil section 12 is bounded by an inner diameter platform (platform) 8 and an outer diameter platform (platform) 14. The inner and outer diameter platforms 8, 14 create the gas path annulus and include cooling holes 72, 74, respectively. The outer diameter platform 14 includes opposing flanges 34, at least one cover 36 (FIG. 2), preferably two, and a rail 38. The inner diameter platform 8 includes a rail 40 and a cover 42 (FIG. 3), preferably two.

The casting of the vane 10 is preferably made of such alloys having typical compositions for use in a gas turbine operating environment. Exemplary U.S. Patents describing columnar and single crystal and directionally solidified alloys include U.S. Pat. Nos. 4,209,348; 4,643,782; 4,719,080 and 5,068,084, each of which is expressly incorporated by reference herein.

The vane 10 lies in the hot gas path and the vane 10 is air-cooled by flowing cooling air, typically from the compressor discharge, into the internal cavities 24. Cooling air enters the internal cavities 24 through corresponding openings in the platforms 8, 14. This air cools the internal surface 26 of the airfoil 12 by convection or internal baffle impingement and cools the convex and concave surfaces 20, 22, respectively, of the airfoil 12 by film cooling. The air is directed from the internal cavities 24 and outward across the vane 10 by a plurality of cooling holes, preferably cylindrical cooling holes 16 and diffusion cooling holes (diffusion holes) 18, to help it withstand the high temperatures to which it is exposed. The cooling air is also directed across the platforms 8, 14 upon exiting the respective cooling holes 72, 74. The trailing edge 30 is cooled by air exiting through the slots 86.

Although FIG. 1 shows the plurality of cooling holes 16, 18 located on the concave surface 22, it is readily understood by those skilled in the art that the plurality of cooling holes 16, 18 are formed on both the convex and concave surfaces 20, 22, respectively.

Figure 4:
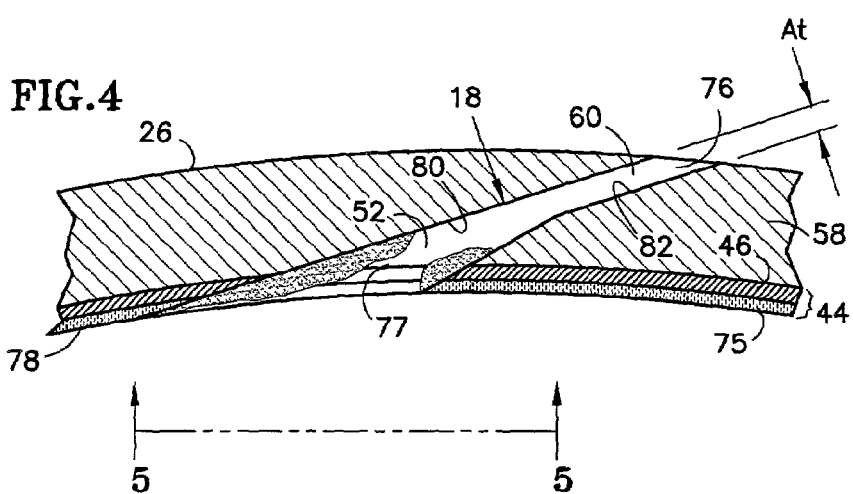
FIG. 4 is an enlarged cross-sectional view taken essentially in the direction 4—4 of FIG. 1 and illustrating the vane substrate, an existing protective coating applied to the substrate and a typical diffusion cooling hole extending through the substrate and the coating.
Figure 5:
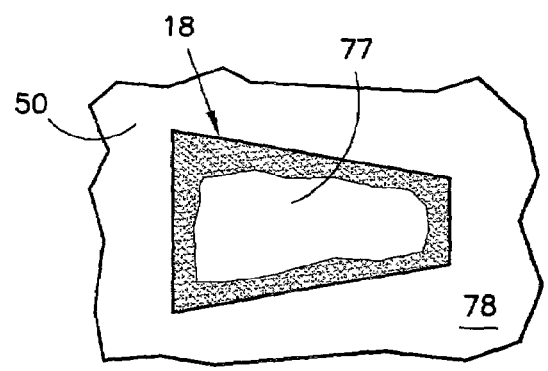
FIG. 5 is a view taken essentially in the direction 5—5 of FIG. 4 showing the diffusion hole prior to the repair of the present invention.

Referring to FIG. 4, a cross-sectional view of the wall thickness of the airfoil 12, and in particular the diffusion hole 18, is shown taken along the line 4—4 of FIG. 1. FIG. 5 shows a view taken essentially in the direction 5—5 of FIG. 4 showing the diffusion hole 18 prior to the repair of the present invention.

To further protect the vane 10 (FIG. 1) from high temperatures, the airfoil 12 and the platforms 8, 14 are coated with a protective surface coating, preferably a thermal barrier coating (TBC) system. The thermal barrier coating system 44 comprises a metallic bond coat 46 disposed over a substrate 58 of the vane 10 (FIG. 1), and a ceramic top coat 75 on top of the bond coat 46.

Referring now to FIGS. 1 and 4, it is noted that that the vane 10 has a plurality of diffusion holes 18 which may have various geometries and predetermined air flow characteristics based on location within the vane 10. The representative diffusion hole 18, shown in FIG. 4, has a metering passage 60 in fluid communication with a diffusion passage (mouth) 52, each having a predetermined geometry. The metering passage 60 has an inlet 76 with a predetermined throat area, shown as At, where the throat area At provides a predetermined air flow requirement. Thus, the inlet 76 regulates cooling air flow into the diffusion holes 18 from the internal cavities 24. The diffusion passage 52 is axially diverging, nonregulatory and extends from the inlet 76 to an outlet 77 at the exterior surface 78 of the vane 10. The diffusion passage 52 facilitates the film cooling of the exterior surface 78 of the airfoil 12 as the cooling air exits from the diffusion passage 52 of the diffusion hole 18. The diffusion passage 52 also includes an inner shaped portion (inner diffuser portion) 80 while the metering passage 60 includes an inner metering portion 82.

The vane 10, once placed in service operation, may experience non-uniform degradation. A local region of the vane 10, represented by 48, may be subject to more strenuous operating conditions during service operation than a local region of the vane 10, represented by 50. Thus, based on the operating conditions experienced by the vane 10, the vane will experience non-uniform degradation, including non-uniform deterioration of the ceramic top coat 75, non-uniform diffusion of the surface coating such as the bond coat 46 into the substrate 58, and/or oxidation of an exposed bond coat 46.

In the above-described type of TBC system, the regions of the vane 10, such as local region 48, subjected to the highest temperatures experience greater oxidation or diffusion loss of critical bond coat elements into the substrate 58, and the potential for TBC spallation and subsequent exposure of the bond coat 46 to the oxidizing and corrosive atmosphere. Cooler regions on the surface of the vane 10 with such a TBC system, such as the local region 50 may be less affected or virtually unaffected by engine operation. The repair method described hereinbelow takes advantage of discrete local regions of the vane 10, such as local regions 48, 50 that are in various states of degradation. In this way, the exterior surface 78 of the vane 10 is not uniformly repaired but rather the repair of the vane 10 is based on local areas of degradation or defect patterns. It is noted that local regions 48, 50 are illustratively used to indicate that different regions of the vane 10, and in particular the diffusion holes 18 contained therein, will undergo different steps in the repair method of the present invention, as will be detailed below. However, it is readily understood by those skilled in the art, that the vane 10 may have multiple regions 48, 50 based on the defect pattern.

As know in the art, the first step in repairing the vane 10 includes removing detachable details such as baffles, and similar parts as appropriate. A smoothing operation to remove the covers 36, 42 is also performed at this time. Other preliminary steps may include cleaning and stress relief by any appropriate method known in the art. For example, a suitable cleaning method could include grit or sand blasting. A suitable stress relief procedure may include heating the part to between about 1950° F. to about 2000° F. in a non-oxidizing atmosphere (e.g., vacuum or argon) for about 7 minutes to about 240 minutes. The internal cavity 24 may be cleaned as necessary at any point during the process by any suitable method known in the art. Still other preliminary steps include grinding the flanges 34 and the removal of the covers 36, 42 by any method known in the art. The covers 36, 42 are preferably removed using a grinding operation since the covers 36, 42 are typically welded onto the respective outer and inner diameter platforms 14, 8.

Following any preliminary steps, the ceramic top coat 75 is removed from the vane 10 using any conventional method known in the art. For example, the ceramic top coat 75 and oxidized coating may be removed by autoclave cleaning in KOH, grit blasting, preferably using an aluminum oxide grit or any other method known in the art. An autoclave cleaning process may include soaking the part in a solution of KOH for about 4 hours to about 8 hours at a pressure of about 375 psia to about 425 psia and a temperature of about 400° F. to about 450° F.

After the ceramic top coat 75 is removed, the metallic bond coat 46 is stripped using methods known in the art. For example, the bond coat 46 may be removed by immersing the vane 10 in an agitated stripping solution, or any other method known in the art. After the stripping process is complete, the vane 10 is then visually inspected to ensure adequate removal of metallic coating and, in particular, to ensure that no residual traces of metallic coating remains on the exposed surface of the substrate 58 of the vane 10. After visual inspection is complete, the vane 10 is cleaned, for example by grit blasting. Next, the vane 10 is placed in a furnace for heat tint to inspect for the presence of metallic coating to determine if the vane 10 is in condition to perform the repair of the present invention. Local patches of residual metallic coating may be carefully blended to remove the excess coating. If large patches of metallic coating remain, the vane 10 will need to repeat the stripping process described hereinabove.

The vane 10 also should be inspected to determine whether it meets certain minimum standards. In general, the vane 10 should satisfy relevant serviceable inspection limits. Moreover, it may be desirable to impose some limitations on the extent of cracking acceptable in the vane 10. For example, it may be preferable to limit vane cracking to cracks no greater than about 30 mils in width and erosion no greater than about 30 mils in depth. Selected criteria may exceed serviceability limits as long as the vane 10 may be repaired within the constraints of the present invention to return the criteria to serviceable limits.

Following inspection, the identified cracks that fall within acceptable service limits are routed to remove oxidation material and dirt. Next, the vane 10 is cleaned, for example, by a grit blasting process followed by an ultrasonic clean, powerflush and Hydrogen Fluoride (HF) cleaning to ensure removal of any residual abrasive material. Then, the identified cracks may be welded.

After the vane 10 is cleaned as described hereinabove, a repair material (repair material) is selectively applied to surface imperfections, such as cracks, including in the vicinity and within selected cooling holes 16, 18 that do no meet the serviceable inspection criteria. For example, diffusion holes adjacent to cracks about generally less than 100 mils wide will receive the repair material. Both cylindrical and diffusion cooling holes 16, 18 that do meet the inspection criteria are selectively filled with the repair material. Regions of the vane 10 are identified, based on the inspection criteria, for application of the repair material. Local region 48 is identified as such a region. This step also has the advantage of only introducing the repair material to the substrate 58 of the vane 10 on an as needed basis. This minimizes the introduction into the substrate 58 of any elements from the repair material.

Repair materials and the processes of applying the respective repair materials to the vane 10 is described in commonly assigned U.S. Pat. No. 4,008,844, Duvall et al., U.S. Pat. No. 4,073,639 Duvall et al., U.S. Pat. No. 5,437,737, Draghi et al. and U.S. Pat. No. 5,549,767, Pietruska et al, each of which is expressly incorporated by reference herein. The repair material is selectively applied to defects in local region 48, and in particular the diffusion holes 18 that do not meet the serviceable inspection criteria. The repair material is manually applied using a dispensing tool that applies a predetermined quantity of repair material in a predetermined time interval at a predetermined pressure to each defect area e.g. cooling hole identified during the inspection. In this way, each identified defect is completely filled with the repair material.

Any excess repair material is then blended using conventional blending or smoothing techniques. The vane 10 is then cleaned using any conventional cleaning technique such as grit blasting to prepare the vane 10 for fluorescent particle inspection (FPI).

Since the application of the repair coat is a time labor intensive and tedious process, the selective placement of the repair material onto the local region 48 of the vane 10 is advantageous. Further, and as described in U.S. Pat. No. 5,437,737, Draghi et al. and U.S. Pat. No. 5,549,767, Pietruska et al., the repair coat contains a melting point depressant, preferably boron.

It is noted that the repair material may constitute a two step process in that there can be two blends of repair material applied sequentially to each identified defect area as described in U.S. Pat. No. 5,437,737, Draghi et al. and U.S. Pat. No. 5,549,767, Pietruska et al.

Prior to application of the bond coat 46 to the entire surface of the vane 10, the vane 10 undergoes a cleaning, preferably a grit blast operation, and then visually inspected using a non-destructive inspection technique. Suitable inspection techniques include, but are not limited to, fluorescent penetrant inspection (FPI) to determine the presence of cracks, x-ray inspection to determine the presence of cracks and wall thickness, and any other appropriate conventional method. Preferably, a FPI process is employed to evaluate size and location of cracks on the surfaces of the vane 10. Indications or distress modes that should be repaired may vary depending on the type of part repaired and the engine from which it comes. It may be desirable to remove cracks found in the vane 10 by routing or any other conventional method. Some cracks might not be repairable. For example, it may be desirable not to repair cracks located within about generally 250 mils of each other and/or greater than about generally 100 mils. Also, it might not be desirable to perform repairs that expose any internal cavities of the vane 10 or cracks from burned or eroded areas.

Next, and prior to application of the bond coat 46, the vane 10 undergoes a pre-coat inspection to ensure that all gas path surfaces are smooth and continuous with no obvious irregularities or blockages. Further, the airfoil 12 thickness is measured to comply with predetermined minimum wall thickness limits.

The metallic bond coat 46 is deposited onto the entire surface of the vane 10 by any method known in the art for depositing such materials. For example, the bond coat may be deposited by using low or reduced pressure plasma spray (LPPS or RPPS), air plasma spray (APS), electron beam physical vapor deposition (EB-PVD), or any other method known in the art. Preferably, the bond coat is applied using LPPS. The bond coat should be applied to a predetermined thickness consistent with the applied thickness of the original bond coat and sufficient to provide a strong bond between the vane 10 and ceramic top coat 75 and to prevent cracks that develop in the ceramic top coat 75 from propagating into the vane 10. For most applications, the bond coat may be about 1 mil to about 3 mils thick.

Following deposition of the bond coat 46, the method of the present invention, as it relates to the remanufacture and reworking of the diffusion holes 18, is described in reference to local regions 48, 50. Diffusion holes 18 within local region 48 will need to be remanufactured since they were filled with the repair material as described hereinabove. In contrast, diffusion holes 18 within the local regions 48, 50 will need to be reworked, which will now be detailed.

Referring now to FIGS. 1, 4 and 5, diffusion holes 18 located in region 50 may require reworking. The application of the nonoriginal metallic bond coat 46 to the entire surface 78 of the vane 10 may result in a quantity of excess bond coating accumulating in the diffusion passage 52 of the diffusion holes 18 thus reducing the area through which the cooling air passes. Since this "coatdown" phenomena, as shown in FIGS. 4 and 5, affects most, if not all of the diffusion holes 18 in region 50, the effectiveness of the cooling medium is diminished and the vane's durability is compromised. The coatdown phenomenon is normally not a problem during the manufacture of original equipment vanes since the protective coatings, and in particular, the metallic bond coat, are usually applied prior to installation of the cooling holes.

It is further noted that cooling holes 72, 74 located in the platforms 8, 14, respectively, and cooling holes 16 located within an area of the leading edge 32 are reworked using laser drilling, as is known in the art, since they are typically cylindrical in shape. However, diffusion holes 18 can not be adequately restored to their original geometry by laser drilling and therefore require electrical discharge machining (EDM). It is important to restore the original geometry to the diffusion holes 18 as each diffusion hole 18 has a predetermined flow characteristic. It is noted that the predetermined flow characteristic of the diffusion holes 18 along the surface 78 of the vane 10 can vary from one diffusion hole 18 to the next.

Therefore, the diffusion holes 18 located in the local region 48 of the vane 10 where the repair material was employed are filled with the repair material and consequently, will need to be remanufactured. The diffusion holes 18 may be remanufactured using any conventional method such as grit blasting, EDM or any other suitable method. Preferably, the EDM process is used with electrodes 56, 62 as will now be described.

Figure 6:
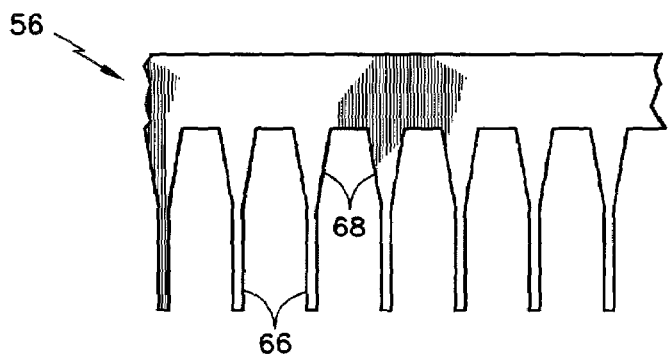
FIG. 6 is a side view of an electrode suitable for use with the repair method of the present invention.
Figure 7:
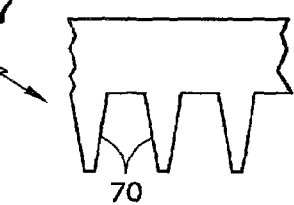
FIG. 7 is a side view of an electrode suitable for use with the repair method of the present invention.

Referring to FIGS. 5, 6 and 7, electrodes 56, 62 suitable for insertion into an electric discharge machining device are shown. Referring to FIGS. 1, 4 and 6, the remanufacture and repair of the diffusion holes 18 in local regions 48, 50 of vane 10 using electrodes 56, 62, respectively, will now be described.

The electrode 56 includes a metering portion 66 and a diffuser portion 68. The electrode 62 includes a diffuser portion 70. It is noted that the geometry of the individual electrodes 56, 62, specifically the respective portions 66, 68, 70, are preselected to correspond to the required shape of the corresponding diffusion hole 18 to which it is used. In particular, the electrode 56 is chosen to restore the inner diffuser portion 80 and inner metering portion 82 of the respective diffusion hole 18 being repaired in region 48. Similarly, the electrode 62 is chosen to restore the inner diffuser portion 80 of the respective diffusion hole 18 being repaired in region 50. This ensures that after the repair is done, the predetermined air flow requirements of the respective diffusion holes 18 are met.

The EDM process is the preferred way to both remanufacture and rework the diffusion holes 18 located in local regions 48, 50, respectively. However, the repair method described herein employs electrodes 56, 62 to different regions of the vane 10 based on the degradation experienced by the different regions 48, 50 of the vane 10 during service operation.

In local region 48, the diffusion hole 18 is now remanufactured using the electrode 56. Since the repair material filled the diffusion hole 18, both the metering portion 66 and diffuser portion 68 of the electrode 56 are required to effect the remanufacture. The diffuser portion 68 of the electrode 56 corresponds in shape to the diffuser passage 52, and more specifically, the inner diffuser portion 80, of the diffusion hole 18. While, the metering portion 66 of the electrode 56 corresponds to the metering passage 60, and more specifically, the inner metering portion 82 of the diffusion hole 18.

However, in local region 50, the diffusion holes 18 may be partially or fully clogged, as described earlier, and therefore will need to be reworked to restore the cooling effectiveness of the diffusion hole 18 as well as vane durability. This is accomplished by using the electrode 62 to remove the excessive bond coat material. The electrode 62 may be easily formed by removing a metering portion from an electrode that has a diffuser portion corresponding in shape to the diffuser passage 52, and more specifically, the inner diffuser portion 80, of the diffusion hole 18. This can be accomplished by using a cutting means, for example scissors, to remove the metering portion.

Thus, it noted that the repair in local region 50, as compared to the repair in local region 48, does not require the manufacture of the metering passage 60 of the diffusion hole 18. The elimination of this step significantly contributes to the reduction of manufacturing costs and time which is critical in a manufacturing environment. Thus, by selectively applying the repair coat to the diffusion holes 18 located within region 48, the diffusion holes 18 located within region 50 will not require remanufacturing but rather reworking. Further, reworking will be done on as needed basis. The use of the electrode 62 provides the benefits of EDM and saves considerably drilling time normally associated with the drilling of the metering passage 60. Thus, the use of electrode 62 contributes only negligibly to repair expense and time. The electrodes 62 are easily produced and their use significantly reduces manufacturing.

In regards to the metering passage 60 of the diffusion hole 18 being reworked, it is further noted that should any excessive bond coat material be located in the metering passage 60, a high velocity, precisely focus stream of abrasive particles can be propelled into the diffusion passage 52 of each affected diffusion hole 18. Since abrasively eroding excess coating from the metering portion 52 of the diffuison hole 18 is done only when required, it will not contribute significantly to the cost and time associated with the repair.

After the remanufacturing and reworking of the diffusion holes 18 is complete and the respective predetermined air flow requirements have been restored, the ceramic top coat 75 may be applied. As understood by those skilled in the art, the laser drilling of the cooling holes 16 may be done either before or after the ceramic top coat 75 is applied.

The ceramic top coat 75 may comprise a mixture of zirconium oxide and a stabilizer such as yttrium oxide ($Y_2O_3$), magnesium oxide (MgO), calcium oxide (CaO), or a mixture thereof. Yttrium oxide is the preferred stabilizer.

The ceramic top coat 75 should include enough stabilizer to prevent an undesirable zirconium oxide phase change (i.e. a change from a preferred tetragonal or cubic crystal structure to the less desired monoclinic crystal structure) over the range of operating temperature likely to be experienced in a particular gas turbine engine. Preferably, the ceramic top coat 75 will comprise a mixture of zirconium oxide and about 3 wt % to about 25 wt % yttrium oxide. Most preferably, the zirconium oxide abrasive coat will comprise about 6 wt % to about 8 wt % yttrium oxide or about 11 wt % to about 13 wt % yttrium oxide, depending on the intended temperature range.

Ceramic top coatings that may be used herein are described in commonly assigned U.S. Pat. Nos 4,321,310 to Ulion et al., U.S. Pat. No. 4,321,311 to Strangman, U.S. Pat. No. 4,401,697 to Strangman, U.S. Pat. No. 4,405,659 to Strangman, U.S. Pat. No. 4,405,660 to Ulion et al., U.S. Pat. No. 4,414,249 to Ulion et al., and U.S. Pat. No. 5,262,245 to Ulion et al., all of which are expressly incorporated by reference. A columnar ceramic top coat 75 may be deposited by EB-PVD or any other physical vapor deposition method known to deposit columnar coating structures. Preferably, the ceramic top coat 75 of the present invention will be applied by EB-PVD because of the availability of EB-PVD equipment and skilled technicians. The ceramic top coat 75 should be applied a thickness sufficient to provide a strong bond with the surface to which it is applied. For most applications, the top coat 75 may be about 5 mils to about 50 mils thick. Preferably, the top coat 75 will be about 5 mils to about 25 mils thick.

In some applications, it may be desirable to apply the ceramic top coat 75 using a thermal spray method such as LPPS or APS. Coatings applied by this method will have a porous structure rather than the columnar structure described above.

Following deposition of the ceramic top coat, the vane 10 may be finished by a series of steps known in the art. These may include:

- laser weld covers 36, 42, install and weld baffles
- plasma spray the outer diameter trailing edge rail 38 and the outer diameter leading edge flange 34
- peening operation
- water flow inspection of trailing edge slots 86 to ensure free from blockage and/or restriction
- airflow inspection cooling holes 16, 18 in airfoil 12, internal cavities 24, and cooling holes 72, 74 in platforms 8, 14, respectively to ensure free from obstruction are correctly metered.

Other steps known in the art may be included as necessary.

The repair method described herein provides a process where a turbine component, and in particular, vane 10, is repaired based on a localized defect assessment, including removing the metallic bond coat and reworking diffusion holes that significantly saves manufacturing turn-around time and repair cost.

It is within the scope of this invention, and understood by those skilled in the art, that the restoration of the predetermined air flow requirements of the cooling holes can be achieved by restoration to the original dimensions of the cooling holes or variations thereof as long as the predetermined air flow requirements of the cooling holes are met after the repair is complete and the article being repaired is supplied the necessary cooling air flow requirements.

When the principles and procedures are described herein for use on the vane 10, it will be obvious to those skilled in the art that the same principles and procedures could be applied to other articles having apertures.

The invention is not limited to the particular embodiments shown and described in this application. Various changes and modifications may be made without departing from the spirit or scope of the claimed invention. One skilled in the art will recognize that the order of the steps can be modified to suit any particular situation. Moreover, certain steps may be deleted in their entirety if they are not required for a particular part. For example, the steps that relate to the routing and blending operations is completed as required based on the condition of the particular component being repaired.

We claim:

1. A method for repairing defects in an article, the article comprising a substrate and an existing coating on a surface of the substrate, the article including a first plurality of cooling holes extending from the substrate and the existing coating and having a predetermined air flow requirement, the plurality of cooling holes having a diffuser passage and an inner metering portion, the method comprising:
   - removing the existing coating;
   - recoating the surface of the article with a nonoriginal coating;
   - providing an electrode for electrical discharge machining; wherein the electrode having only a diffuser shaped portion;
   - receiving the electrode in the diffuser passage of the plurality of cooling holes; and
   - removing the nonoriginal coating from only the diffuser passage using electrical discharge machining such that the diffuser passage meets the predetermined air flow requirement.

2. The method of claim 1 further comprising:
   - propelling a stream of abrasive particles into the inner metering portion of the plurality of cooling holes to remove the nonoriginal coating from the inner metering portions of the plurality of cooling holes.

3. The method of claim 1, wherein the article further includes a second plurality of cooling holes having a predetermined air flow requirement, the method further comprising:
   - filling the second plurality of cooling holes with a repair material prior to the recoating step; and
   - remanufacturing the cooling holes filled with the repair material to meet the predetermined air flow requirement of the second plurality of cooling holes using electrical discharge machining.

4. The method of claim 3 wherein the first and second plurality of cooling holes are diffusion holes.

5. The method of claim 1 wherein the existing coating is a thermal barrier coating system comprising a metallic bond coat and a ceramic thermal barrier coating on top of the bond coat.

6. The method of claim 1, wherein the substrate is an alloy selected from the group consisting of cobalt base alloys, nickel base alloys and iron base alloys.

7. The method of claim 6, wherein the alloy is a nickel or cobalt base superalloy.

8. The method of claim 1 wherein the article is a gas turbine vane.

9. A method for repairing defects in an article, the article comprising a substrate and an existing coating on a surface of the substrate, the article including a first plurality of cooling holes extending from the substrate and the existing coating and having a predetermined air flow requirement, the plurality of cooling holes having an outer shaped portion and an inner metering portion, the method comprising:
- removing the existing coating;
- recoating the surface of the article with a nonoriginal coating;
- providing an electrode for electrical discharge machining; wherein the electrode having only a shaped portion with a preselected shape;
- receiving the electrode in the outer shaped portion of the plurality of cooling holes;
- removing the nonoriginal coating from the outer shaped portion using electrical discharge machining such that the outer shaped portion meets the predetermined air flow requirement; and
- propelling a stream of abrasive particles into the inner metering portion of the plurality of cooling holes to remove the nonoriginal coating from the inner metering portions of the plurality of cooling holes.

* * * * *